United States Patent Office 3,175,997
Patented Mar. 30, 1965

3,175,997
METHOD OF PREPARING POLYMERS CONTAINING HYDROXY END GROUPS
Henry L. Hsieh, Bartlesville, Okla., assignor to Phillips Petroleum Company, a corporation of Delaware
No Drawing. Filed Oct. 23, 1959, Ser. No. 848,193
10 Claims. (Cl. 260—85.1)

This invention relates to a method of preparing polymers containing terminally reactive hydroxy groups. In another aspect this invention relates to a method of forming polymers containing hydroxy end groups which can be further reacted to form higher molecular weight materials.

As used herein, the term "terminally reactive polymers" designates polymer which contains a reactive group on one or more ends of the polymer chain.

I have discovered that polymers containing reactive hydroxy end groups can be obtained in appreciable yields by reacting in a hydrocarbon medium a polymer containing terminal alkali metal atoms with an epoxy compound, preferably at elevated temperatures, and replacing the alkali metal atoms in the resulting polymer with hydrogen atoms. The polymer thus produced can be further reacted with suitable coupling agents to produce higher molecular weight materials. For example, the hydroxy-containing polymers prepared according to the process of my invention can be treated with agents which react with the hydroxy end groups to produce coupling and/or crosslinking. Liquid polymers can be increased in viscosity and converted to solids while soft gums can be cured to more rigid materials. The end products are useful as adhesives, potting compounds, tread stocks and also for the manufacture of many types of molded objects.

It is an object of my invention to provide a method of forming a polymer containing terminally reactive hydroxy groups.

Another object is to provide a process capable of producing polymers containing hydroxy end groups in appreciable yield.

Still another object is to form a polymer which can be readily reacted further to increase its molecular weight substantially.

Other objects, advantages and features of my invention will be apparent to those skilled in the art from the following discussion.

The polymers which are employed in the process of my invention contain terminal alkali metal atoms. These polymers are reacted in solution with an epoxy compound having the formula:

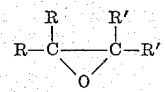

wherein each R and each R' is selected from the group consisting of hydrogen, alkyl, aryl, alkaryl, aralkyl and cycloalkyl radicals and one R and one R' can together form an alkylene radical. The epoxy compound has from 2 to 30 carbon atoms per molecule. I have found that improved yields of the hydroxy-terminally reactive polymer can be obtained if elevated temperatures are used, for example, between about 50 to 250° C.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employer are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethyl-vinyl group, such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.; similar mono- and disubstituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers of polymerizable vinylidene compounds and copolymers of conjugated dienes with vinylidene compounds also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal. The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally on at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. The general reaction can be illustrated graphically as follows:

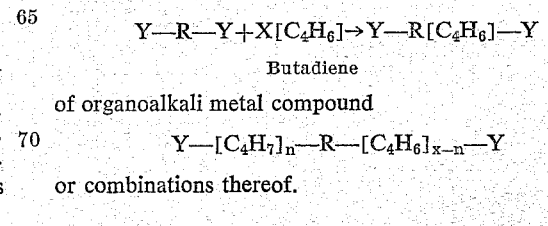

or combinations thereof.

A specific example is:

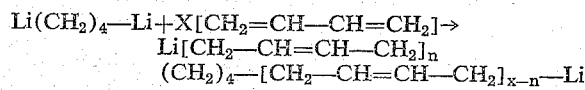

In the specific example 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkli metals, of course, include sodium, potassium, lithium, rubidium, and cesium. The organic radical of the organo alkali metal compound can be aliphatic, cycloaliphatic or aromatic radical. For example, mono-, di and polyalkali metal substituted hydrocarbons can be employed including methyllithium, n-butyllithium, n-decyllithium, phenyllithium, naphthyllithium, p-tolyllithium, cyclohexyllithium, 4 - butylphenylsodium, 4 - cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl-2-butene,1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2,3-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2-disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2-dipotassio-3-phenylpropane, 1,2-di(lithiobutyl)benzene, 1,3-dilithio-4-ethylbenzene,1,4-dirubidiobutane, 1-dicesiooctane, 1,5,12-trilithiododecane, 1,4,7-trisodioheptane, 1,4-di(1,2-dilithio-2-phenylethyl)benzene, 1,2,7,8-tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithiotriphenylethane, 1,2-disodio-1,2-diphenylethane, dilithiomethane, 1,4-dilithio-1,1,4,4-tetraphenylbutane, 1,4-dilithio - 1,4 - diphenyl-1,4-dinaphthylbutane, and the like.

While the organo alkali metal initiators in general can be employed, certain specific initiators give better results than others and are preferred in carrying out the preparation of the terminally reactive polymers. For example, of the condensed ring aromatic compounds the lithium-anthracene adduct is preferred, but the adducts of lithium with naphthalene and biphenyl can be employed with good results. Of the compounds of alkali metals with polyaryl-substituted ethylenes, the preferred material is 1,2-dilithio-1,2-diphenylethane (lithium-stilbene adduct). Ordinarily the organo dialkali metal compounds are more effective than others in promoting the formation of the terminally reactive polymers. The organo dialkali metal compounds which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organo dilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with those materials, including low reaction temperatures. Since it is desirable to obtain a maximum yield of terminally reactive polymer, it is within the scope of the invention to use separation procedures, particularly with alkali metal initiators other than lithium compounds to separate terminally reactive polymer from the polymer product.

The terminally reactive polymers prepared as hereinbefore described contain an alkali metal atom on at least one end of the polymer chain and the organo radical of the initiator is present in the polymer chain. These compounds are converted to polymers containing terminal hydroxy groups by reaction in a hydrocarbon diluent with an epoxy compound as previously described. The diluent can conveniently be the same that was used for the polymerization. Likewise the diluent is generally a hydrocarbon having 4 to 10 carbon atoms per molecule and preferably an aromatic hydrocarbon.

The epoxy compound can be selected from a large group of suitable material such as ethylene oxide; propylene oxide (1,2-epoxypropane); butylene oxide (1,2-epoxybutene and 2,3-epoxybutane); 1,2-epoxypentane; 1,2-epoxy-3-methylbutane; 2,3-epoxy-3-methylbutane; 1,2-epoxy - 2,4,4 - trimethylpentane; 1,2-epoxycyclohexane; 1,2-epoxycyclooctane; 1,2-epoxy-4-cyclohexylpentane; 1,2-epoxyoctadecane; 1,2-epoxyeicosane; styrene oxide; 1,2-epoxytriacontane; 1,2 - epoxy - 2 - cyclohexylbutane; 3,4-epoxy-3,4-diethylhexane; 3,4 - epoxy-3-ethyl-4-phenylhexane; 1,2-epoxy-2-(p-tolyl)butane; 2,3-epoxy-3-methyl-2-benzylpentane; and the like.

Since it is desired to react the polymer containing terminal alkali metal groups while in solution I prefer to add the epoxy compound to the unquenched polymer solution formed in the polymerization process. By "unquenched polymer" is meant polymer which has not been treated with any type of reagent to inactivate the catalyst. The temperature at which the epoxy compound and polymer are reacted should be at least room temperature (about 25° C.) and preferably in the range of 50 to 250° C. Elevation of the temperature during treatment with the epoxy compound gives a product with a higher hydroxy content than is otherwise obtained. I have found, however, that in instances where the polymer is rubbery, fairly good results can be obtained at room temperature by using an aromatic solvent such as toluene.

In general satisfactory operation requires a temperature above 50° C. and a temperature in the range of 100 to 200° C. produces the best results.

The reaction time is governed largely by the temperature, that is, higher temperatures require shorter reaction periods. The reaction time is normally at least 30 minutes and can be as high as 80 hours or more although there is seldom need to extend the reaction period beyond 10 hours. The reaction is facilitated by agitation. Upon acidification of the reaction mixture, washing and recovery of a product containing terminal hydroxy groups is obtained.

The amount of epoxy compound used can vary over a broad range, for example, from 1 to 40 gram mols per gram atom of lithium present in the polymer. When a large excess of epoxy compound is used under proper conditions a portion of the epoxy compound polymerizes and forms blocks of epoxy polymer with the terminal hydroxy groups.

The reaction mechanism by which the polymers containing alkali metal atoms on at least one end of the polymer chain are converted to polymers containing terminal hydroxy groups can be illustrated as follows (P represents the polymer chain containing the organo radical of the initiator):

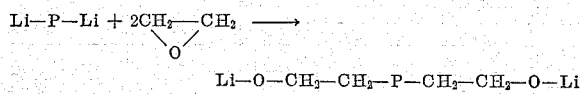

The alkali metal atoms are then replaced with hydrogen atoms by hydrolysis or reaction with a suitable reagent such as dilute mineral acids, glacial acetic acid or other organic acids, alcohols or alcohol-water mixtures such as methylalcohol, ethyl alcohol solution, mixtures of alcohols and acids and the like, for example:

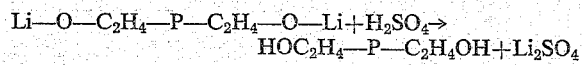

The hydroxy-terminally reactive polymer prepared according to my invention can be converted into a useful material by reaction with a coupling agent such as a polyisocyanate. By "polyisocyanate" I refer to compounds containing 2 or more NCO groups. By controlling the amount of polyisocyanate either coupling and/or cross linking can be effected. If coupling alone occurs the product will be gel free, linear polymers providing the starting material contained no gel, whereas cross linking is indicated by the presence of gel. Tolylene diisocyanates such as 2,4- and 2,3-tolylene diisocyanates are particularly effective coupling and curing agents. Polyaryl polyisocyanates such as the commercial product designated as PAPI 1 (Corwin Chemical Company) are also effective. PAPI 1 has the formula:

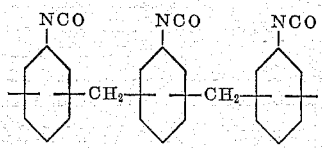

an average molecular weight of about 380 and an average of about 3 isocyanate groups per molecule.

Other coupling agents can be used such as anhydrides, the di and tri carboxy acids or the corresponding acid chlorides, chloromethylphosphonic dichloride, and the like. It is preferred that at least a stoichiometric amount of coupling agent be used but an amount slightly below this, e.g. 80 to 90 percent of the stoichiometric, to a large excess is satisfactory. For best results the amount of coupling agent is in the range of stoichiometric to 30 percent excess.

In polymers with a molecular weight below about 10,000 a high density of cross links can be obtained with the cross links formed by reaction of the coupling agent with the hydroxy end groups. Liquid polymers can readily be converted to semi-solids and thus can be used as castable polymers. Sulfur can be used to provide additional curing if desired. Alternatively the polymer can be subjected to cross linking dosages of high energy radiation such as gamma rays, X-rays, neutrons, alpha or beta particles. It should be understood that the coupling obtained as a result of tying up the ends of the polymer chain through the terminal hydroxy groups is in addition to the cure normally obtained with conventional curatives. The amount of conventional curative will be in the range of 0.05 to 5 parts by weight per 100 parts of rubber, preferably between 0.1 to 3 parts.

Curing temperatures can vary over a broad range depending upon the choice of coupling agent and/or cross linking agent. Temperatures in the range of 150 to 320° F. are applicable. When coupling with polyisocyanates temperatures of 150 to 200° F. are satisfactory. When compounding the polymer thus prepared various types of carbon black or mineral fillers can be used as desired.

To further illustrate the advantages of my invention the following examples are presented. The specific materials and conditions used should be considered typical only and not as unduly limiting my invention.

*Example I*

1,2-dilithio-1,2-diphenylethane was used as the initiator for the polymerization of butadiene in acordance with the following recipe:

Butadiene, parts by weight _____ 100.
Cyclohexane, parts by weight _____ 1560.
1,2-dilithio-1,2-diphenylethane, mmoles __ 40.
Temperature, ° F. _____ 122 (50° C.).
Time, hours _____ 1
Conversion, percent _____ Quantitative.

Polymerization was effected in a Parr reactor. Cyclohexane was charged after which prepurified nitrogen was passed through the reactor. 1,2-dilithio-1,2-diphenylethane was added followed by the butadiene. After polymerization was allowed to proceed for one hour, 200 mmoles of ethylene oxide was added, as a 5 molar solution in cyclohexane, and the mixture was stirred for 2 hours while the temperature was maintained at 50° C. Another run was made similar to the first except that the temperature was maintained at 120° C. for 2 hours after the addition of ethylene oxide. A third run was made in which the final step was carried out at 240° C. for one hour. One run without ethylene oxide treatment was made for control purposes. The reaction mixtures were acidified with hydrochloric acid, washed with water, and the solvent evaporated. Results of hydroxy, inherent viscosity, and gel determinations are shown below:

| Run | Hydroxy Content, percent | Inherent Viscosity | Gel, percent |
|---|---|---|---|
| Control | ---- | 0.18 | 0 |
| Ethylene oxide at 50° C., 2 hrs | 0.81 | 0.16 | 0 |
| Ethylene oxide at 120° C., 2 hrs | 0.98 | 0.12 | 0 |
| Ethylene oxide at 240° C., 1 hr | 0.91 | 0.16 | 0 |

Products resulting from the ethylene oxide treatment were slightly yellowish, liquid polymers. The hydroxy content in each case was determined by refluxing the sample in admixture with acetic anhydride and pyridine for 30 minutes. The excess of acetic anhydride was then titrated with sodium hydroxide.

When ethylene oxide is added at room temperature to an unquenched polymer solution containing terminal lithium atoms, an instantaneous reaction occurs and the mixture sets up to a solid gel. The mixture becomes fluidized upon addition of acid but the final product shows very little, if any, evidence of the presence of hydroxy groups.

Example II

Butadiene was polymerized at 50° C. using the recipe given in Example I. Quantitative conversion was obtained after 1.5 hours. The unquenched polymer solution was treated with 1200 mmoles of ethylene oxide, added as a 5 molar solution in cyclohexane. The mixture was heated at a temperature ranging from 110 to 160° C., with stirring, for 4 hours. It was then acidified with hydrochloric acid, washed with water, and solvent evaporated. Inherent viscosity and gel determinations were made on the polymer before and after treatment with ethylene oxide. These results, together with the hydroxy content of the treated polymer are shown below:

|  | Inherent Viscosity | Gel, percent | Hydroxy Content, percent |
|---|---|---|---|
| Control | 0.24 | 0 |  |
| Ethylene oxide treated polymer | 0.09 | 0 | 0.64 |

To two grams of the hydroxy-containing polymer 0.14 gram of PAPI 1 was added and the mixture was heated at 160° F. for 96 hours. Results of inherent viscosity, gel and swelling index determinations were as follows:

Inherent viscosity _____ 0.34
Gel, percent _____ 61
Swelling index _____ 0.19

The high gel content indicates that the polymer contained hydroxy groups and was cured when heated with the polyisocyanate curative.

Example III

Butadiene was polymerized in accordance with the following recipe:

Butadiene, parts by weight _____ 100.
Toluene, parts by weight _____ 1296.
1,2-dilithio-1,2-diphenylethane, mmoles ___ 40.
Temperature, ° C. _____ 50.
Time, hours _____ 1.
Conversion, percent _____ Quantitative.

Polymerization was effected in a Parr reactor as in the preceding examples. A large excess of ethylene oxide was added and the mixture was heated to 160° C. for one hour during which time it was stirred. Hydrochloric acid was added, the polymer solution was washed, and the solvent evaporated. Inherent viscosity, gel, and hydroxy content on the control and ethylene oxide-treated polymers were as follows:

|  | Inherent Viscosity | Gel, percent | Hydroxy Content, percent |
|---|---|---|---|
| Control | 0.36 | 0 |  |
| Ethylene oxide treated polymer | 0.32 | 0 | [1] 1.23 |

[1] Theoretical hydroxy content.

Both polymers were liquids.

The hydroxy-containing polymer (4 grams each) was cured with variable amounts of PAPI 1 for 5 days at 160° F. The following results were obtained:

| PAPI 1, grams | Inherent Viscosity | Gel, percent | Swelling Index |
|---|---|---|---|
| 0.3 | 0.42 | 0 |  |
| 0.4 | 0.45 | 0 |  |
| 0.5 | 0.98 | 69 | 18 |

A small amount of coupling apparently occurred in the first 2 runs. The run using 0.5 part curative (stoichiometric amount) gave a cross linked product as evidenced by the gel content.

Example IV

Butadiene was polymerized to quantitative conversion at 50° C. in accordance with the following recipe:

Butadiene, parts by weight _____ 100
Toluene, parts by weight _____ 1728
1,2-dilithio-1,2-diphenylethane, mmoles _____ 30

Toluene was charged first, the reactor was purged with nitrogen, butadiene was added, and then the initiator. After a 1-hour polymerization period, 1136 mmoles of ethylene oxide in cyclohexane was introduced. The mixture was heated slowly to 100° C., and held at this temperature for 5 hours, after which it was acidified with hydrochloric acid, washed, and the solvent evaporated. The polymer had an inherent viscosity of 0.18 and was gel free. Variable amounts of tolylene-2,4-diisocyanate were mixed with 10 gram samples of the hydroxy-containing polymer and the mixtures were heated at 160° F. for 2 days. Results of inherent viscosity and gel determinations on the products are shown below:

| Tolylene-2,4-diisocyanate, grams | Inherent Viscosity | Gel, percent |
|---|---|---|
| 0.40 | 0.42 | 0 |
| 0.30 | 0.27 | 0 |

Inherent viscosity results indicate that coupling occurred. There was no obvious change in the polymer which was heated without any curative.

Butadiene was polymerized at 50° C. in accordance with the following recipe:

Butadiene, parts by weight _____ 100
Cyclohexane, parts by weight _____ 780
1,2-dilithio-1,2-diphenylethane, mmoles _____ 30

At the conclusion of the polymerization, the reactor was removed from the 50° C. bath and 120 mmoles of ethylene oxide was added after the temperature had dropped below 50° C. In less than 1 hour after addition of the ethylene oxide, dilute hydrochloric acid was added to the solid gel and the mixture became fluid. It was washed with water and the solvent evaporated. The resulting polymer, after being heated with tolylene-2,4-diisocyanate, had an inherent viscosity of 0.21. There was no apparent change in the product as a result of being heated with the curing agent.

Example V

Rubbery polybutadiene was prepared in accordance with the following recipe:

Butadiene, parts by weight _____ 100
Cyclohexane, parts by weight _____ 780
1,2-dilithio-1,2-diphenylethane, mmoles _____ 1.8
Temperature, ° C. _____ 50
Time, hours _____ 4

After a 4-hour polymerization period, 36 mmoles of ethylene oxide was added and the mixture was stirred for 2 hours while the temperature was held at 120° C. It was then acidified with hydrochloric acid, washed with water and the polymer was coagulated with isopropanol and dried in a vacuum oven. A control polymer (no ethylene oxide) was made for comparative purposes. Results of inherent viscosity, gel, and Mooney determinations (ML-4 at 212° F.) were as follows:

|  | Inherent Viscosity | Gel, percent | ML-4 |
|---|---|---|---|
| Control | 1.49 | 0 | 5 |
| Ethylene oxide treated polymer | 1.31 | 0 | 5 |

The hydroxy-containing polymer was compounded in accordance with the following recipe:

| | Parts by weight |
|---|---|
| Hydroxy-containing polymer | 100 |
| Philblack O [1] | 50 |
| Zinc oxide | 3 |
| Stearic acid | 2 |
| Flexamine [2] | 1 |
| Santocure [3] | 1 |
| Resin 731 [4] | 3 |
| Sulfur | 1.7 |

[1] High abrasion furnace black.
[2] Physical mixture containing 65 percent of a complex diarylamine-ketone reaction product and 35 percent of N,N'-diphenyl-p-phenylenediamine.
[3] N-cyclohexyl-2-benzothiazylsulfenamide.
[4] Disproportionated pale rosin stable to heat and light.

The untreated polybutadiene (inherent viscosity 1.49) was compounded in accordance with the recipe and used as a control. The hydroxy-containing polymer was compounded with and without 1 phr. tolylene-2,4-diisocyanate (TDI). The stocks were cured 30 minutes at 307° F. and physical properties determined. Results were as follows:

| | Tensile, p.s.i. | Elongation, percent | Resilience, percent | ΔT, °F. |
|---|---|---|---|---|
| Polybutadiene control | 2,210 | 380 | 63.9 | 67.2 |
| Hydroxy-containing polymer | 2,240 | 390 | 63.2 | 68.9 |
| Hydroxy-containing polymer with TDI | 2,640 | 430 | 71.4 | 64.5 |

The above data demonstrate the added effect of coupling the ends of the polymer chains through a terminal hydroxy group. Addition of the hydroxy group alone had little effect upon the properties of the sulfur-cured polymer; however, with the coupling agent (TDI) incorporated in the polymer, tensile, elongation and resilience were increased while heat build up was reduced.

It is thus demonstrated that the process of my invention provides an attractive method of preparing curable polymers. Liquid and semi-solid polymers can be vulcanized to rubbery and crosslinked products. A wide variety of products can be obtained when operating in accordance with the present process to give materials which are suitable as adhesives, potting compounds, propellant binders, and also for the manufacture of many types of molded objects.

As will be evident to those skilled in the art from the above disclosure, various other embodiments and modifications of my invention can be made without departing from the spirit or scope thereof.

I claim:

1. A process for the preparation of polymer having hydroxy end groups which comprises reacting in a hydrocarbon media a terminally reactive polymer of monomers selected from the group consisting of conjugated dienes containing from 4 to 12 carbon atoms per molecule, aryl-substituted olefins, heterocyclic nitrogen-containing monomers, acrylic acid esters, alkacrylic acid esters, vinylfuran and vinylcarbazole, said polymer having 1 to 4 terminal alkali metal atoms, with an epoxy compound having the formula

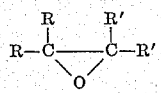

wherein each R and each R' is selected from the group consisting of hydrogen, alkyl, aryl, cycloalkyl, alkaryl, and aralkyl radicals and one R and one R' can together form an alkylene radical, said epoxy compound having from 2 to 30 carbon atoms per molecule, at a temperature in the range of 50 to 250° C., and replacing the alkali metal atoms in the resulting polymer with hydrogen atoms.

2. The process of claim 1 wherein said reacting is carried out in an aromatic diluent.

3. The process of claim 2 wherein said diluent is toluene.

4. A process for the preparation of polymer having hydroxy end groups which comprises reacting in a hydrocarbon media a terminally reactive polymer of monomers selected from the group consisting of conjugated dienes containing from 4 to 12 carbon atoms per molecule, aryl-substituted olefins, heterocyclic nitrogen-containing monomers, acrylic acid esters, alkacrylic acid esters, vinylfuran and vinylcarbazole, said polymer having 1 to 4 terminal lithium atoms, with an epoxy compound having the formula

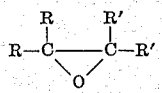

wherein each R and each R' is selected from the group consisting of hydrogen, alkyl, aryl, cycloalkyl, alkaryl, and aralkyl radicals and one R and one R' can together form an alkylene radical, said epoxy compound having from 2 to 30 carbon atoms per molecule, at a temperature in the range of 50 to 250° C., and acidifying the resulting mixture.

5. The process of claim 4 wherein said polymer is polybutadiene and said epoxy compound is ethylene oxide.

6. The process of claim 4 wherein said polymer is a copolymer of butadiene and styrene and said epoxy compound is ethylene oxide.

7. A process for the preparation of polymer having hydroxy end groups which comprises reacting a terminally reactive polymer of monomers selected from the group consisting of conjugated dienes containing from 4 to 12 carbon atoms per molecule, aryl-substituted olefins, heterocyclic nitrogen-containing monomers, acrylic acid esters, alkacrylic acid esters, vinylfuran and vinylcarbazole, said polymer having about 2 terminal lithium atoms per molecule, with from 1 to 40 mols per gram atom of lithium in the polymer of an epoxy compound having the formula

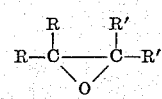

wherein each R and each R' is selected from the group consisting of hydrogen, alkyl, aryl, cycloalkyl, alkaryl, and aralkyl radicals and one R and one R' can together form an alkylene radical, said epoxy compound having from 2 to 30 carbon atoms per molecule in a hydrocarbon diluent at a temperature in the range of 100 to 200° C. for at least 30 minutes with agitation, acidifying the resulting mixture, washing the mixture with water and evaporating said diluent to recover the polymer.

8. The process of claim 7 wherein said polymer is polybutadiene and said epoxy compound is ethylene oxide.

9. A process for the preparation of polymer having hydroxy end groups which comprises reacting in a hydrocarbon diluent a terminally reactive polymer of monomers selected from the group consisting of conjugated dienes containing from 4 to 12 carbon atoms per molecule, aryl-substituted olefins, heterocyclic nitrogen-containing monomers, acrylic acid esters, alkacrylic acid esters, vinylfuran and vinylcarbazole, said polymer having 1 to 4 terminal lithium atoms, with an epoxy compound having the formula

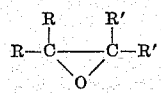

wherein each R and each R' is selected from the group consisting of hydrogen, alkyl, aryl, cycloalkyl, alkaryl, and aralkyl radicals and one R and one R' can together form an alkylene radical, said epoxy compound having from 2 to 30 carbon atoms per molecule, at a temperature in the range of 50 to 250° C., and replacing the lithium atoms in the resulting polymer with hydrogen atoms by acidifying the resulting mixture.

10. The process of claim 9 wherein said reacting is carried out at a temperature in the range of 100 to 200° C. for at least 30 minutes with agitation and after is acidified the polymer is recovered by washing the mixture with water and evaporating said diluent.

References Cited in the file of this patent

UNITED STATES PATENTS

| | | |
|---|---|---|
| 2,792,382 | Edmonds | May 14, 1957 |
| 2,829,130 | Greenspan | Apr. 1, 1958 |
| 2,829,135 | Greenspan | Apr. 1, 1958 |
| 3,055,952 | Goldberg | Sept. 25, 1962 |

OTHER REFERENCES

Organo-Metallic Compounds, Coates Methuen and Co., London (1956), page 8.

Chemistry of Organic Compounds, Noller, Saunders and Co., Philadelphia, Pa. (1957), page 745.

UNITED STATES PATENT OFFICE
CERTIFICATE OF CORRECTION

Patent No. 3,175,997            March 30, 1965

Henry L. Hsieh

It is hereby certified that error appears in the above numbered patent requiring correction and that the said Letters Patent should read as corrected below.

Column 11, line 10, after "after" insert -- the resulting mixture --.

Signed and sealed this 24th day of August 1965.

(SEAL)
Attest:

ERNEST W. SWIDER
Attesting Officer

EDWARD J. BRENNER
                                       Commissioner of Patents